(12) United States Patent
Reasoner et al.

(10) Patent No.: US 6,231,476 B1
(45) Date of Patent: May 15, 2001

(54) PARK-LOCK SHIFTER CABLE

(75) Inventors: Michael V. Reasoner, Grand Blanc; Allen G. Irish, Flint; David J. Sherman, Sterling Heights, all of MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/453,143

(22) Filed: Dec. 2, 1999

(51) Int. Cl.[7] .................................................. F16H 59/74
(52) U.S. Cl. .............................................................. 477/99
(58) Field of Search ............................... 477/99; 180/271; 192/220.2, 220.3, 220.4; 70/247, 248

(56) References Cited

U.S. PATENT DOCUMENTS

| | | |
|---|---|---|
| 3,987,878 | 10/1976 | Hansen . |
| 4,473,131 | 9/1984 | Mochida . |
| 4,474,085 | 10/1984 | DeVogelaere et al. . |
| 4,660,443 | 4/1987 | Simancik . |
| 4,919,242 | 4/1990 | Muramatsu et al. . |
| 4,926,688 * | 5/1990 | Murasaki ............................ 477/99 X |
| 4,932,283 | 6/1990 | Ishigami et al. . |
| 4,932,493 * | 6/1990 | Sakurai et al. ...................... 477/99 X |
| 4,986,143 | 1/1991 | Livshits et al. . |
| 5,078,242 * | 1/1992 | Ratke et al. ......................... 477/99 X |
| 5,167,308 | 12/1992 | Osborn . |
| 5,197,356 | 3/1993 | Kobayashi et al. . |
| 5,207,124 | 5/1993 | Anderson et al. . |
| 5,255,570 | 10/1993 | Shirahama et al. . |
| 5,428,977 * | 7/1995 | Knape ..................................... 70/247 |
| 5,431,266 | 7/1995 | Ito et al. . |
| 5,551,266 | 9/1996 | Behrens . |
| 5,695,429 * | 12/1997 | Kataumi et al. ............... 192/220.3 X |

* cited by examiner

*Primary Examiner*—Charles A Marmor
*Assistant Examiner*—Roger Pang
(74) *Attorney, Agent, or Firm*—Howard & Howard

(57) ABSTRACT

A park-lock follower (50) for a shifter assembly (10) is provided which coacts with a shifter (34) pawl to lock and unlock a key in an ignition switch (112). The pawl (34) is disposed within a gate (18) having a plurality of stepped regions (22, 24, 26, 28) that is supported by a base (16). The follower (50) is attached to one end (62) of a cable assembly (52) and is supported by the base (16) adjacent to a park stepped region (22) for rectilinear movement along an axis (A). The follower (50) is moved linearly to an unlocked position (X) in response to the pawl (34) being moved to the park stepped region (22) for unlocking the key in the ignition switch (112). The follower (50) is moved linearly to a locked position (Y) in response to the pawl (34) being moved to one of the non-park stepped regions (24, 26, 28) for locking the key in the ignition switch (112).

9 Claims, 5 Drawing Sheets

PARK-LOCK SHIFTER CABLE

BACKGROUND OF THE INVENTION

1. Field of the Invention

The present invention relates to a park-lock assembly for unlocking and locking a key in an ignition switch when a transmission is in a park and non-park position.

2. Description of the Prior Art

Park-lock systems have been used to ensure that a vehicle is in park before a driver removes the key from the ignition switch and leaves the vehicle. To this end, prior art transmission shifting devices have incorporated mechanical linkages to interconnect the shifter assembly and the ignition switch. One end of the mechanical linkage is connected to the shifter assembly and an opposite end is connected to the ignition switch. When the shifter assembly is moved into park, the drifter assembly end moves thereby moving the ignition switch end which coacts with the ignition switch to release the key therefrom. When the shifter assembly is moved out of park, the mechanical linkage coacts with the ignition switch to retain the key therein.

As known in the art, console shifter assemblies have utilized shifters that have a pawl that is disposed within a gate defining a shift pattern. Prior art park-lock systems have utilized a cam-like follower that rotates about a pivot to coact with the pawl and move the mechanical linkage. One such device is disclosed in U.S. Pat. No. 5,197,356 to Kobayashi et al. issued Mar. 30, 1993. The Kobayashi cam-like follower, and similar prior art rotating followers, utilizes many moving parts that interact with one another and create hysteresis in the cable, which causes undesired park-lock assembly operation. Therefore, what is needed is a park-lock follower with a simplified design that provides improved operation.

SUMMARY OF THE INVENTION AND ADVANTAGES

The present invention provides a park-lock assembly for unlocking and locking a key in an ignition switch when a transmission is in a park and non-park position, respectively. The assembly has a base and a gate supported thereon with a park stepped region which corresponds to the transmission being in the park position and a plurality of non-park stepped regions. A shift lever is movably supported by the base and has a transversely extending pawl movable between the stepped regions when the shift lever is moved. A conduit has a first end supported by the base and a second end for connection to the ignition switch. A core element having opposing ends is movably supported by the conduit for transmitting motion between the first and second ends of the conduit. The assembly is characterized by including a follower attached to one of the opposing ends at the first end and supported by the base adjacent to the park stepped region for rectilinear movement along an axis. The follower is moved to an unlocked position in response to the pawl being moved to the park stepped region for unlocking the key in the ignition switch. The follower is moved to a locked position in response to the pawl being moved to one of the non-park stepped regions for locking the key in the ignition switch.

Accordingly, the present invention provides a follower that moves linearly thereby eliminating the hysteresis in the mechanical linkage of the prior art cam-like followers. Further, the present invention provides a simple design that is easily installed onto the shifter assembly.

BRIEF DESCRIPTION OF THE DRAWINGS

Other advantages of the present invention will be readily appreciated by reference to the following detailed description when considered in connection with the accompanying drawings wherein.

DETAILED DESCRIPTION OF THE PREFERRED EMBODIMENT

Figure 1:
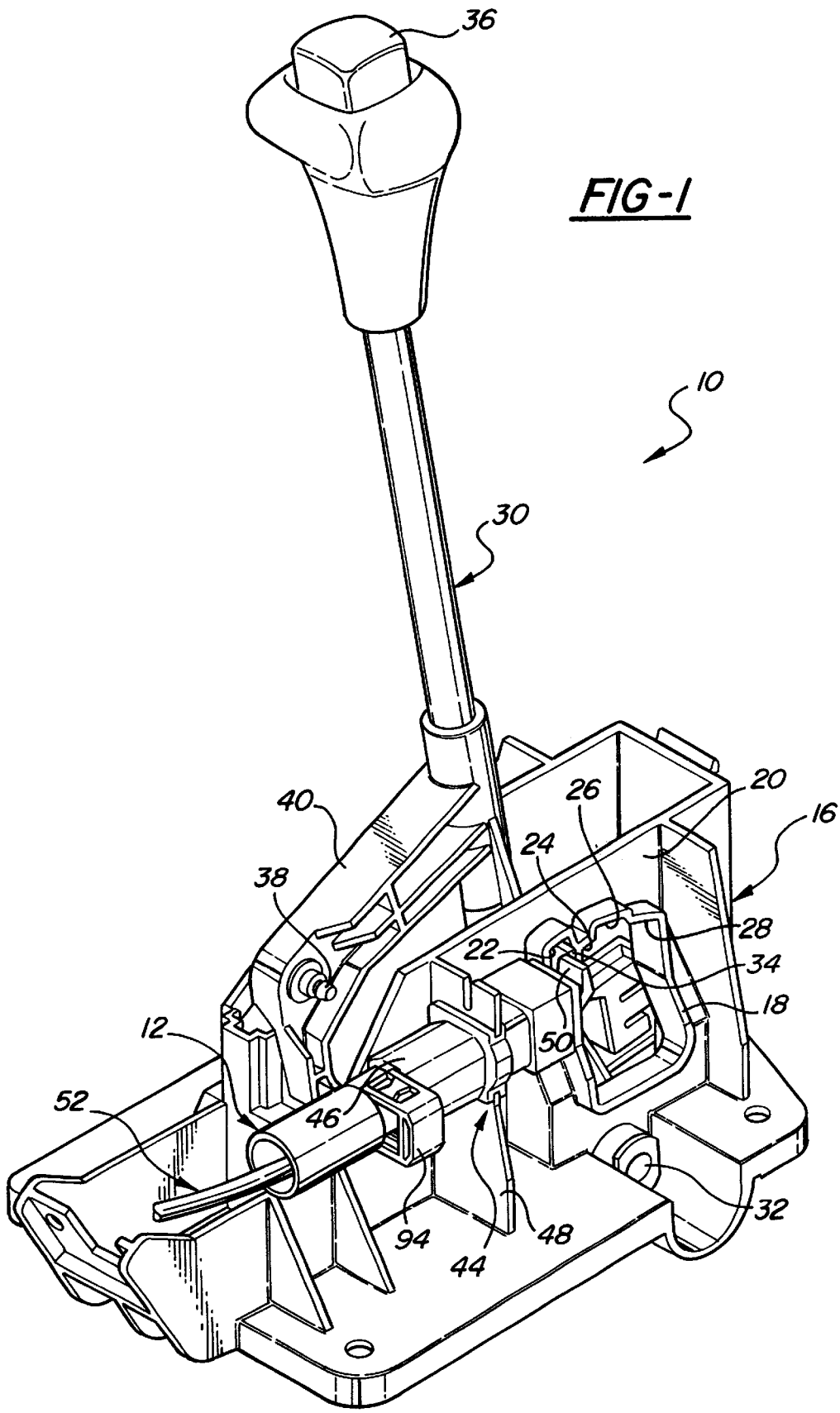
FIG. 1 is a perspective view of a shifter with the park-lock assembly of the present invention.

Referring to drawings, wherein like numbers indicate like or corresponding parts throughout the several views, a shifter mechanism is generally shown at 10 and includes a park-lock assembly generally shown at 12 for unlocking and locking a key in an ignition switch. The park-lock assembly 12 relays to the ignition switch when the vehicle's transmission is in a park and non-park position through operation of the shifter assembly 10. By non-park position it is meant that the transmission is in either a forward or reverse drive gear or in neutral.

The park-lock assembly 12 has a base generally indicated at 16 for attaching the shifter assembly 10 to the vehicle's floor (not shown). The base 16 may be a single piece or several separate pieces welded or snapped together. A gate 18, which defines the shift pattern, is supported on one side 20 of the base 16. The gate 18 has a park stepped region 22 which corresponds to the transmission being in the park position and a plurality of non-park stepped regions 24, 26, 28 which correspond to reverse gear, neutral, and the forward drive gears, respectively.

A shift lever generally indicated at 30 is movably supported on the base 16 by a pivot 32 that allows the shift lever 30 to be moved forward and rearward. The park stepped region 22 is typically oriented toward the front of the vehicle while the non-park stepped regions 24, 26, 28 are arranged rearward of park. The shift lever 30 has a transversely extending pawl 34 movable between the stepped regions 22, 24, 26, 28 when an actuating button 36 is depressed and the shift lever 30 is moved forward or rearward. A connection 38 on a lower portion 40 of the shift lever 30 connects the shift lever 30 to the transmission by a shift cable (not shown) for shifting the transmission between gears.

The park-lock assembly 12 has a shifter end 44 that is supported by the base 16 and an ignition switch end that is connected to the ignition switch, discussed below and shown in FIGS. 5A and 5B. The shifter end 44 has a housing 46 supported by a flange 48 extending from the base 16. A follower generally shown at 50 is at least partially disposed within the housing 46 and arranged adjacent to the park stepped region 22. The follower 50 coacts with the pawl 34 to detect the presence of the pawl 34 in the park stepped region 22. A cable assembly 52 interconnects the follower 50 and the ignition switch (shown in FIG. 5B).

Figure 2:
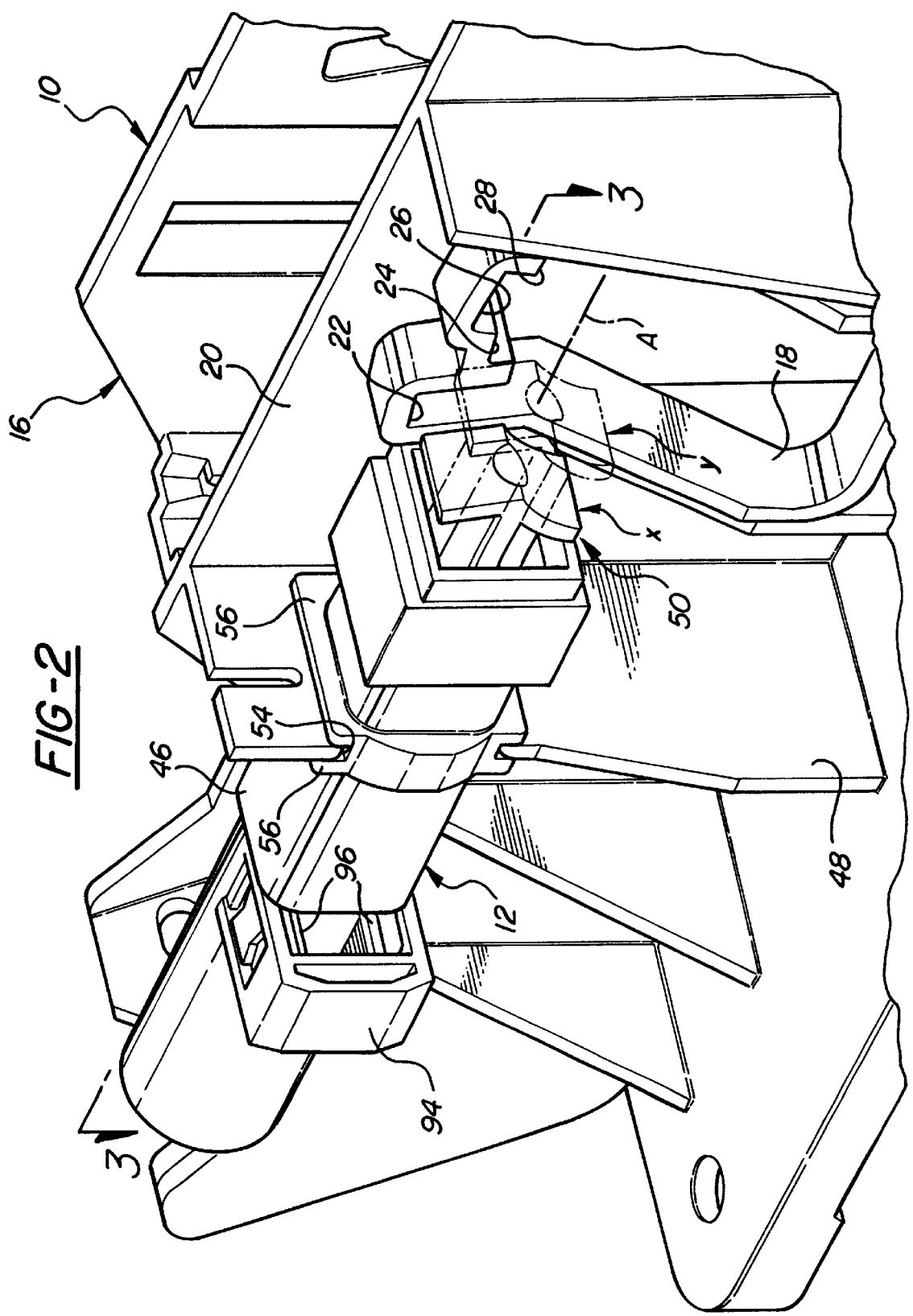
FIG. 2 is a perspective view of the park-lock assembly in the unlock position.

Referring to FIG. 2, the follower 50 is shown in an unlocked position, X, and a locked position, Y, which correspond to the park and non-park stepped regions, respectively. The pawl is not shown in FIG. 2 for clarity. When the follower 50 is in the unlocked position, X, in response to the pawl being moved to the park stepped region 22, the key is unlocked from the ignition switch. Conversely, when the follower 50 is in the locked position, Y, in response to the pawl being moved to one of the non-park stepped regions 24, 26, 28, the key is locked into the ignition switch.

The flange 48 has an aperture 54 that receives the housing 46. Opposing lips 56 extend outwardly from the housing 46 with the flange 48 interposed therebetween to retain the housing 46 in the aperture 54. The housing 46 defines an axis, A, along which the follower 50 moves between the unlocked, X, and locked, Y, positions.

Figure 3:
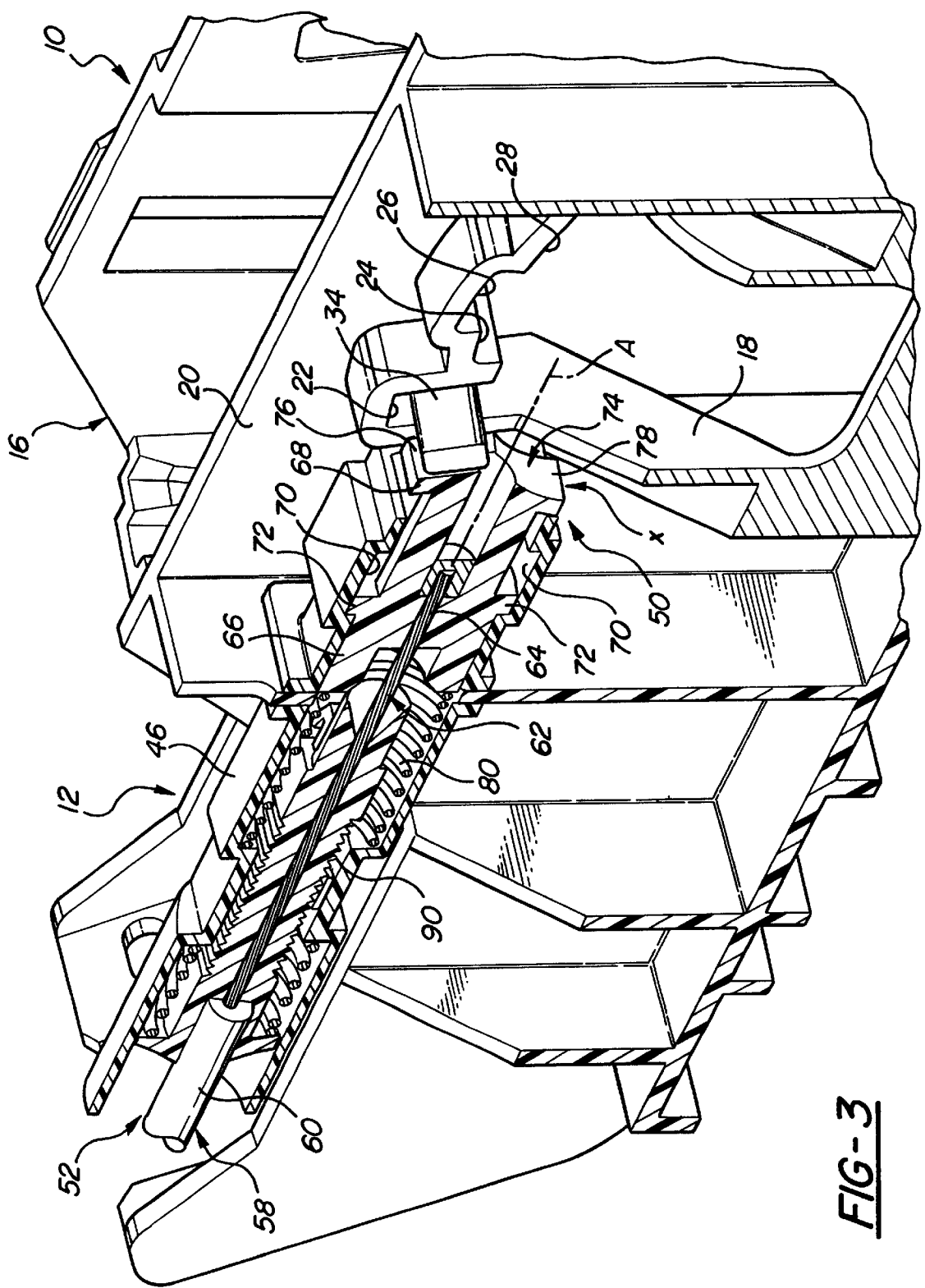
FIG. 3 is a cross-sectional perspective view taken along line 3—3 in FIG. 2.

Turning now to FIG. 3, the cable assembly 52 has a conduit 58 with a first end 60 supported by the base 16 and a second end (shown in FIGS. 5A and 5B) connected to the ignition switch. A flexible core element 62 having opposing ends is movably supported by the conduit 58 for transmitting motion between the ends of the conduit 58. One end 64 of the core element is attached to the follower 50 so that when the follower 50 moves the opposing end (shown in FIG. 5B) of the core element 62 moves in a like manner. Said another way, when the follower 50 moves in a direction relative to the conduit 58, the opposing end moves in the same direction relative to the conduit 58.

The follower 50 has an elongated portion 66 which is retained in the housing 46 and an engagement portion 68 which extends from the housing 46 to coact with the pawl 34. The housing 46 has opposing interior pockets 70, and the follower 50 has opposing tabs 72 extending transversely from the elongated portion 66 and disposed within the interior pockets 70. The pockets 70 and tabs 72 together define the boundary along which the follower may move along axis, A.

The engagement portion 68 includes a cam face 74 with an upper surface 76 that abuts the pawl 34 when it is in the park position 22. The cam face 74 also has a curved lower surface 78 angled downwardly from the upper surface 76 for camming engagement with the pawl 34 as the pawl 34 is moved into the park stepped region 22 from one of the non-park stepped regions 24, 26, 28.

Figure 4:
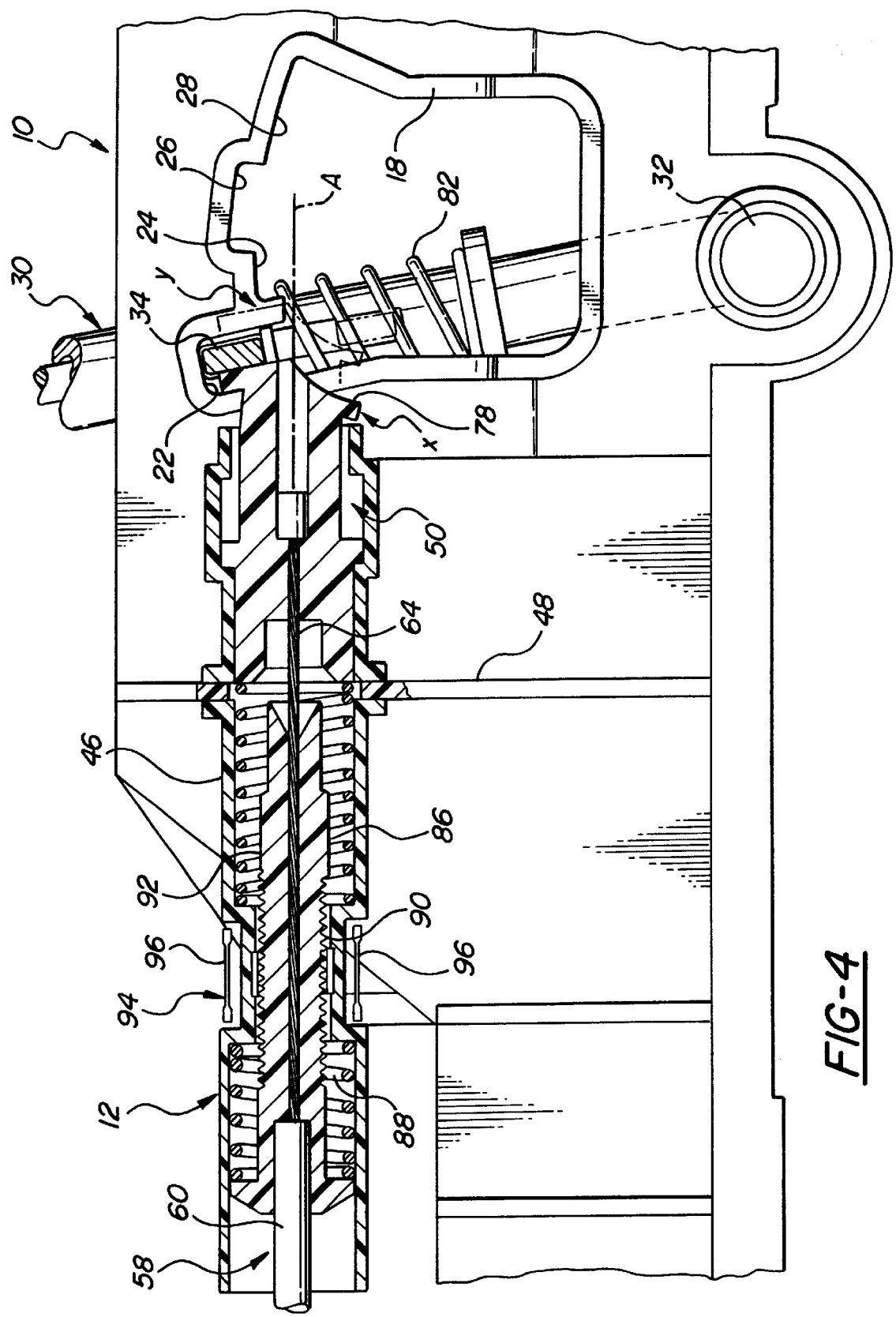
FIG. 4 is a cross-sectional side view of the park-lock assembly similar to the view shown in FIG. 3.

A first spring 80 having a first spring force is interposed between the housing 46 and the follower 50 for biasing the follower toward the locked position, Y, when the pawl 34 is not in the park stepped region. Referring to FIG. 4, a second spring 82 having a second spring force is disposed within the shift lever 30 to coacting with the pawl 34 for biasing the pawl 34 toward said stepped regions 22, 24, 26, 28. The second spring force is sufficient to overcome the first spring force and move the follower 50 from the locked position, Y, to the unlocked position, X, when the pawl 34 engages the lower surface 78. The angle of the lower surface 78 relative to the pawl 34 may be adjusted to reduce the spring force of the second spring 82 necessary to overcome the first spring force.

The park-lock assembly 12 also includes a conduit length adjuster 86 disposed within the housing 46. The first end 60 of the conduit 58 is secured to the length adjuster 86 so that when the length adjuster 86 moves the conduit 58 moves with it. A third spring 88 is interposed between the length adjuster 86 and the housing 46 for biasing the conduit 58 away from the stepped regions 22, 24, 26, 28 so that there is tension between the follower 50 and conduit 58 during installation of the park-lock assembly 12 onto the shifter assembly 10.

The conduit length adjuster 86 includes a plurality of teeth 90 about a portion of its outer surface 92. A movable retainer clip 94 is supported by the housing 46 and has opposing legs 96 that extend into the housing 46 adjacent to the plurality of teeth 90. The clip 94 is slidable between an unlocked and a locked position in which the retainer clip 94 engages the teeth 90 and fixes the length adjuster 86 relative to the housing 46. Once the park-lock assembly 12 is connected to the shifter assembly 10 and the ignition switch, the third spring 88 achieves the proper tension in the cable assembly 52 and the length adjuster 86 may be locked into position by the retainer clip 94.

Figure 5A:
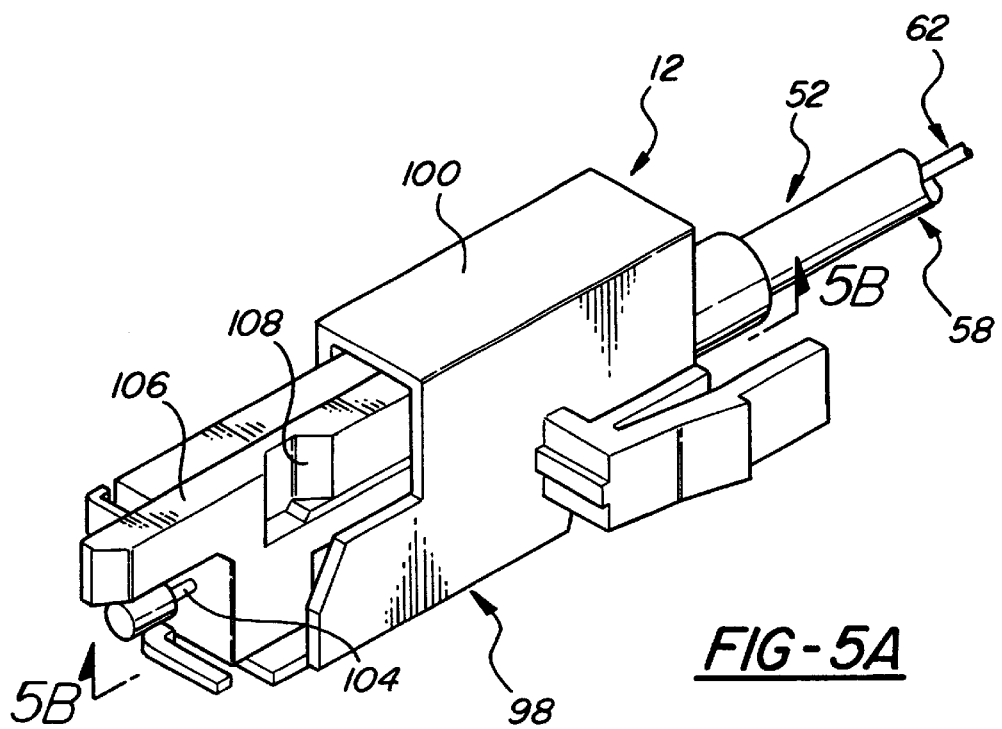
FIG. 5A is perspective view of the cable assembly end which connects to the ignition switch.
Figure 5B:
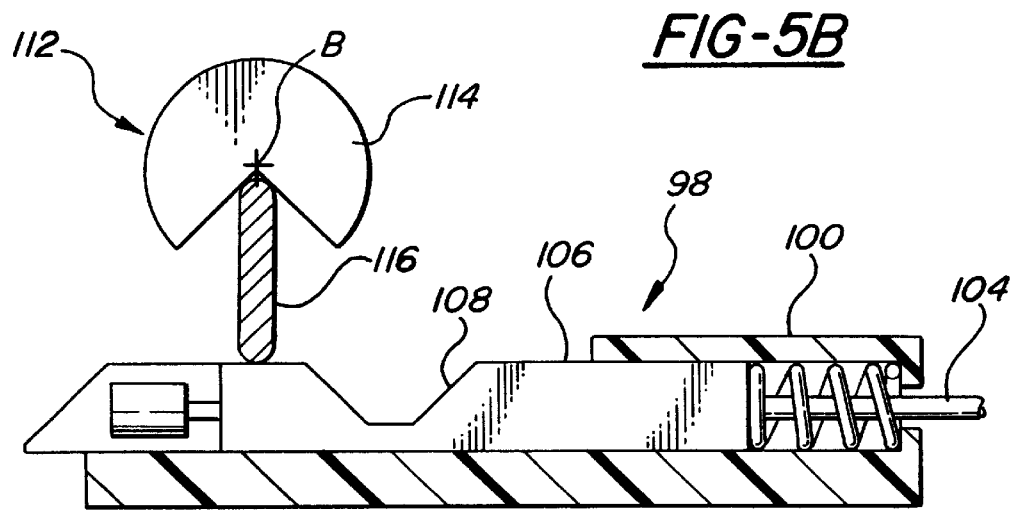
FIG. 5B is a cross-sectional view taken along 5B—5B in FIG. 5A with the cable assembly connected to the ignition switch.

Referring to FIGS. 5A and 5B, the ignition switch end 98 of the park-lock assembly 12 is shown. The ignition switch end 98 is supported by a housing 100. A second end 102 of the conduit 58 is supported by the housing 100 and supports the opposing end 104 of the core element 62. A detent 106 having a notch 108 is slidably received by the housing 100. The opposing end 104 is attached to the detent 106 so that movement of the follower 50 may be transmitted to the detent 106. A fourth spring 110 interposed between the housing 100 and detent 106 biases the detent 106 outwardly.

A portion of the ignition switch is shown schematically at 112 in FIG. 5B. As known in the art, a cylinder 114 is connected to a key (not shown) and rotates with the key about an axis, B. A pin 116 is interposed between the detent 106 and lock cylinder 114. When the pin 116 and cylinder 114 are in the position shown in FIG. 5B, the key cannot be removed from the ignition switch 112. The notch 108 corresponds to the park position so that when the shifter lever 30 is moved to the park position the pin 116 is received in the notch 108. With the pin 116 received in the notch 108, the cylinder 114 may be rotated and the key removed.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A park-lock assembly (12) for unlocking and locking a key in an ignition switch (112) when a transmission is in a park and non-park position respectively, said assembly (12) comprising:

a base (16);

a gate (18) supported by said base (16) and having a park stepped region (22) which corresponds to the transmission being in the park position and a plurality of non-park stepped regions (24, 26, 28);

a shift lever (30) movably supported by said base (16) and having a transversely extending pawl (34) movable between said stepped regions (24, 26, 28) when said shift lever (30) is moved;

a conduit (58) having a first end (60) supported by said base (16) and a second end (102) for connection to the ignition switch (112), a core element (62) movably supported by said conduit (58) and having opposing ends (64, 104) for transmitting motion between said first (60) and second (102) ends of said conduit (58); and said assembly (12) being characterized by including a follower (50) attached to one of said opposing ends (64, 104) at said first end (60) and supported by said base (16) adjacent to said park stepped region (22) for rectilinear movement along an axis (A) to be moved to an unlocked position (X) in response to said pawl (34) being moved to said park stepped region (22) for unlocking the key in the ignition switch (112) and to be moved to a locked position (Y) in response to said pawl (34) being moved to one of said non-park stepped regions (24, 26, 28) for locking the key in the ignition switch (112), a housing (46) supported by said base (16) and defining said axis (A), said follower (50) at least partially disposed within said housing (46) for rectilinear movement along said axis (A).

2. The assembly (12) as set forth in claim 1 wherein said housing (46) has at least one interior pocket (70), and said follower (50) has at least one tab (72) extending transversely from said follower (50) and disposed within said at least one interior pocket (70) whereby said pocket (70) defines a boundary of said rectilinear movement of said follower (50).

3. The assembly (12) as set forth in claim 2 further including a first spring (80) interposed between said housing (46) and said follower (50) for biasing said follower (50) toward said locked position (Y).

4. The assembly (12) as set forth in claim 3 wherein said follower (50) includes a cam face (74) with an upper surface (76) which abuts said pawl (34) in said park position (22) and a lower surface (78) angled downwardly from said upper surface (76) for camming engagement with said pawl (34) as said pawl (34) is moved into said park stepped region (22).

5. The assembly (12) as set forth in claim 4 further including a second spring (82) disposed within said shift lever (30) and coacting with said pawl (34) for biasing said pawl (34) toward said stepped regions (22, 24, 26, 28).

6. The assembly (12) as set forth in claim 5 wherein said first (80) and second (82) springs have a first and second spring force, respectively, said second spring force being sufficient to overcome said first spring force and move said follower (50) from said locked position (Y) to said unlocked position (X).

7. The assembly (12) as set forth in claim 6 further including a conduit length adjuster (86) secured to said first end (60) and disposed within said housing (46), a third spring (88) interposed between said length adjuster (86) and said housing (46) for biasing said conduit (58) away from said stepped regions (22, 24, 26, 28).

8. The assembly (12) as set forth in claim 7 wherein said conduit length adjuster (86) includes a plurality of teeth (90), a movable retainer clip (94) supported by said housing (46) for movement between an unlocked and a locked position in which said retainer clip (94) engages said teeth (90) and fixes said length adjuster (86) relative to said housing (46).

9. The assembly (12) as set forth in claim 8 wherein said core element (58) is flexible.

* * * * *